United States Patent [19]

Abayasekara et al.

[11] Patent Number: 5,209,850
[45] Date of Patent: May 11, 1993

[54] HYDROPHILIC MEMBRANES

[75] Inventors: Dilip R. Abayasekara, Newark; Robert L. Henn, Wilmington, both of Del.

[73] Assignee: W. L. Gore & Associates, Inc., Newark, Del.

[21] Appl. No.: 901,318

[22] Filed: Jun. 19, 1992

[51] Int. Cl.$^5$ .............................................. B01D 71/36
[52] U.S. Cl. ................................ 210/500.36; 264/45.1; 264/DIG. 48; 264/DIG. 62
[58] Field of Search .................. 264/41.451, DIG. 62, 264/DIG. 48; 210/500.21, 500.27, 500.36, 639; 55/158

[56] References Cited

U.S. PATENT DOCUMENTS 5,037,457  8/1991  Goldsmith et al. .................. 55/158

Primary Examiner—Frank Sever
Attorney, Agent, or Firm—Gary A. Samuels

[57] ABSTRACT

Normally hydrophobic fluoropolymer porous membranes having continuous pores are rendered hydrophilic by coating the pore interior with a mixture of at least one fluoroaliphatic surfactant and at least one hydrophilic but substantially water-insoluble polyurethane.

7 Claims, No Drawings

HYDROPHILIC MEMBRANES

FIELD OF THE INVENTION

This invention relates to water-permeable coated products and more specifically to coated porous membranes.

BACKGROUND OF THE INVENTION

It is well known that fluoropolymers have excellent chemical and heat resistance and in general are hydrophobic. It is also known that expanded porous polytetrafluoroethylene (ePTFE) polymers have superior strength properties. Thus, expanded porous polytetrafluoroethylene is useful as a filter media for organic solvents and for use in harsh chemical environments.

However, because of the hydrophobicity of fluoropolymers, aqueous dispersions cannot readily be filtered through filters made from these fluoropolymers. Such filters can be prewetted with organic solvents followed by flushing with water or using pressure to overcome the lack of affinity between the hydrophobic filter and the polar aqueous dispersion. However, such prewetting is expensive over the long term and can lead to "gas-lock" or "dewetting."

For these reasons, there have been various attempts to make fluoropolymer surfaces more hydrophilic and receptive to wetting with water while still maintaining their desirable properties. One approach is to coat the surface and the interior of the pores with a fluorinated surfactant to improve hydrophilicity. Since the fluorosurfactant is bound to the surface of the membrane only by means of chemical affinity, the weakness of this approach is that over a period of time the fluorosurfactant will be washed out by the aqueous medium and the membrane will lose its water-wettability. In an attempt to solve this problem, another approach has been to use a fluorosurfactant which is then crosslinked by an irradiation treatment using a high energy radiation beam such as Gamma ray, electron beam or non-equilibrium plasma. Such a crosslinked material will not diffuse out of the fluoropolymer matrix even when it is exposed to aqueous flow for an extended period of time. However, the high energy radiation weakens the mechanical strength of the fluoropolymer and the fluorinated surfactant will also suffer adverse effects ranging from deterioration of properties to alteration of its chemical properties.

SUMMARY OF THE INVENTION

To overcome the deficiencies described above, in this invention, normally hydrophobic fluoropolymeric porous membranes having continuous pores, i.e., passageways, are rendered hydrophilic, i.e., water-permeable, by coating the membrane with a mixture of at least one fluoroaliphatic surfactant and at least one substantially liquid water-insoluble hydrophilic polyurethane. By continuous pores or passageways is meant that the membrane has interstices that comprise continuous passageways extending through the thickness of the membrane so that the passageways open on both sides. The coating coats the surface and at least a portion of the interior of the passageways but does not block the passageways, and thus does not prevent flow of water through the membrane.

The surfactant renders the fluoropolymeric porous membrane hydrophilic, but ordinarily it is not durable and washes out as the membrane is used in aqueous filtration. Surprisingly, it has now been discovered that the presence of the hydrophilic polyurethane protects the surfactant and inhibits its wash out. The polyurethane apparently binds the surfactant to the fluoropolymer membrane and makes the inventive compositions durable with respect to the resulting hydrophilic properties.

DESCRIPTION OF THE INVENTION

While the preferred hydrophobic fluoropolymer porous membrane used as a starting material herein is porous polytetrafluoroethylene, any porous fluoropolymer membrane can be employed. In addition to polytetrafluoroethylene (PTFE), other satisfactory fluoropolymers include polyvinylfluoride, polyvinylidenefluoride, polychlorotrifluoroethylene, polyfluoroethylenepropylene, perfluoroalkoxyethylene/tetrafluoroethylene (TFE) copolymers, chlorotrifluoroethylene/ethylene copolymers, and TFE/ethylene copolymers. Preferably, the membrane will be from about 1 to about 200 micrometers thick. Preferably also the membrane will be porous expanded polytetrafluoroethylene which has an internal interconnecting porous structure made of nodes interconnected with fibrils as described in U.S. Pat. No. 3,953,566. Preferably also the void content will be 50-95% by volume.

The fluoroaliphatic surfactant has a long chain fluoroalkyl group, i.e., a $CH_3(CF_2)_m$ group where m is an integer of 3-8, as one moiety and should impart a low surface tension to water, e.g., less than 30 dynes per cm. It can be non-ionic or anionic, and preferably can be a fluorinated alcohol, ester, organic acid or organic salt. Surfactants with fluorinated alkyl end groups are preferred because they appear to have an affinity for the —$CF_2$moieties in the fluoropolymer membrane and are less susceptible to washing out than non-fluorinated surfactants. Suitable surfactants include Zonyl fluorosurfactants made by the DuPont Co., such as, Zonyl FSA fluorosurfactants represented by the formula $R_fCH_2CH_2SCH_2CH_2COOLi$; where $R_f$ is $F(CF_2-CF_2)3-8$; Zonyl FSN fluorosurfactants represented by the formula $Rf\text{-}CH_2CH_2O(CH_2CH_2O)_xH$ where $R_f$ is $F(CF_2CF_2)3-8$ and x is a cardinal number of 7-12; Fluorad FC-171 made by 3M Co. which is believed to be a nonionic fluorinated alkyloxylate, probably represented by the formula

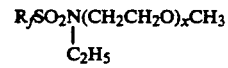

where $R_f$ is $CnF_{2n+1}$, and x is numeral greater than 1 and n is about 8; and Fluorad FC-430 made by 3M Co. which is a nonionic fluoroaliphatic polymeric ester.

The polyurethane is hydrophilic, i.e. transports water molecules through it by diffusion, but is otherwise substantially water-insoluble, i.e. does not dissolve in water. A preferred class of polyurethanes are hydrophilic polyurethanes having hard and soft segments. Hydrophilicity is afforded by a soft segment consisting of a polyol containing oxyethylene units, i.e. (—O—$CH_2CH_2$—). The hard segment of these polymers is the reaction product of polyisocyanate and chain extender (if used).

One class of useful polyurethanes comprise the reaction product of:

(i) a polyol of primarily oxyethylene units, having a number average molecular weight from about 600 to about 3500;
(ii) a polyisocyanate; and optionally
(iii) a low molecular weight bifunctional chain extender having a molecular weight in a range lower than about 500. Within this class, more preferred is the reaction product of:
(i) a poly(alkylene ether)glycol of primarily oxyethylene units, having a number average molecular weight from about 600 to about 3500;
(ii) a diisocyanate; and
(iii) a low molecular weight bifunctional chain extender having a molecular weight in a range lower than about 500.

By way of example, the chain extender can be 1,4-butane diol, 1,6-hexane diol, hydroquinone di(-hydroxyethyl)ether, bis(hydroxyethyl)bisphenol A, bis(2-hydroxypropyl)bisphenol A, bis(2-hydroxypropyl)isophthalate, bis(2-hydroxethyl)carbamate, 1,2-bis(2-aminophenylthio)ethane, trimethylene glycol dipaminobenzoate, resorcinol di(-hydroxyethyl)ether, 1,4-cyclohexane dimethanol, 4,4'-dihydroxy diphenyl sulfone, 4,4'-methylene bis(ochloroaniline), phenylene diamine, methylene bis(aniline), ethanolamine, N,N'-(bis-2-hydroxethyl)dimethylhydantoin, ethylene diamine, butane diamine, and the like. The low molecular weight bifunctional chain extenders may be used singly or in admixture with each other.

The polyisocyanate can be, but is not limited to, 4,4'-diphenylmethane diisocyanate, cyclohexanediisocyanate, p-phenylene diisocyanate, 1,5-naphthalene diisocyanate, toluene diisocyanate, diisocyanate, hexamethylene diisocyanate, 4,4'-dicyclohexylmethane diisocyanate, 4-bis(isocyanomethyl)-cyclohexane, p-tetramethylxylene diisocyanate, m-tetramethylxylene diisocyanate or the like. The organic diisocyanates may be employed singularly or in combination. Preferably the polyol will be poly(oxyethylene) glycol or a mixture of it with other poly(oxyalkylene) glycols.

One preferred polyurethane is the reaction product of a poly(oxyalkylene)glycol of molecular weight between about 1,000-2,000 and containing in excess of 70% oxyethylene units, 4,4' dicyclohexylmethane disocyanate, and a glycol having a molecular weight less than 500.

The membrane may be laminated to a strengthening backing, such as a porous nonwoven polypropylene or polyester backing, if desired.

The membrane or laminate is coated preferably by immersing it in a solution of the polyurethane and surfactant for a desired time, depending on the weight percent add-on desired. The solution penetrates into the pores and coats the pore interior, e.g., the nodes and fibrils of expanded, porous polytetrafluoroethylene, as well as the surface, but does not fully block the pores.

Alternate coating procedures can be used, e.g., pressure driven coating methods.

TEST PROCEDURES

Vertical Flow-Through Test

A Millipore filtering device was used consisting of two parts: Part #XXII04702 Part (1): A holder base and support screen; Part #XXII04704 Part (2): Clear plastic funnel, 250 ml volume. Part 2 is fitted onto Part (1).

The device was used to determine flow-through times of water through samples of coated membrane or laminate. The bottom of the Millipore filtering device was unscrewed, the sample placed on it and then the filter was fixed in place by screwing back the bottom portion of the unit. The Millipore filtering device was mounted on a 100 ml graduated cylinder.

The test was performed by pouring 100 ml of distilled water onto the fixed sample (17.34 $cm^2$ area/disc) and simultaneously starting a stop-watch. The time for the first drop of water to filter through the unit as well as the time for 50 ml of $H_2O$ to filter through was recorded. From this data, the vertical flowthrough rate in ml/minute was calculated for each sample. The Millipore filtering device was dried between each run. All tests were done at atmospheric pressure and ambient temperature.

Bubble Point

Bubble point of porous polytetrafluoroethylene (PTFE) is measured following ASTM F 316-86 using isopropyl alcohol. Bubble point is the pressure of air required to blow the first continuous bubbles detectable by their rise through a layer of isopropyl alcohol covering the PTFE, and provides an estimate of maximum pore size.

EXAMPLES

In the examples, the polyurethane used was the reaction product of poly(oxyethylene) glycol, 4,4' dicyclohexylmethane diisocyante and diethylene glycol. The polyurethane had a relative molecular weight of about 20,000 (Mn) as determined by Size Exclusion Chromatography using polyethylene glycol standards for calibration.

EXAMPLE 1

A nonionic fluoroaliphatic polymeric ester surfactant (Fluorad FC-430 made by 3M Company) and polyurethane were dissolved in tetrahydrofuran in amounts resulting in 0.5% by weight FC-430 and 1% polyurethane in the solution.

Three porous, hydrophobic, expanded polytetrafluoroethylene (PTFE) materials were used. The first was a microporous, hydrophobic, expanded PTFE membrane (membrane 1) having an average bubble point of about 8.7; the second was the same membrane but laminated to a nonwoven polyester backing (laminate 1); the third was a microporous, hydrophobic, expanded PTFE membrane of an average bubble point of 2.4 laminated to a nonwoven polyester backing (laminate 2).

The three materials were each immersed in the solution of polyurethane and surfactant. Samples were immersed for 1 minute and other samples for 5 minutes. Then the treated samples were fixed on a hoop so that on drying they would not shrink or wrinkle. They were then air dried at room temperature overnight. The dried material was then weighed to determine weight percent add-on of the polyurethane and surfactant solids.

Results are shown in Table 1.

TABLE 1

| Sample | Immersion Time (min) | Treatment Wt. % Add-On | Distilled Water VFT Rate (mL/min)(b) |
| --- | --- | --- | --- |
| 0.45 um membrane-1 | 1 | 10.94 | 2.4 |
| 0.45 um membrane-1 | 5 | 15.83 | 2.5 |
| 0.45 um laminate-1 | 1 | (a) | 2.0 |
| 0.45 um laminate-2 | 5 | (a) | 1.4 |
| 3.0 um laminate-1 | 1 | 5.68 | 29.4 |

TABLE 1-continued

| Sample | Immersion Time (min) | Treatment Wt. % Add-On | Distilled Water VFT Rate (mL/min)(b) |
|---|---|---|---|
| 3.0 um laminate-2 | 5 | 11.70 | 13.6 |

(a) These samples delaminated a little due to dissolution of bonding agent by the solvent, tetrahydrofuran.
(b) In comparison, untreated membrane had no water flow through (VFT = 0).

EXAMPLE 2

A solution was prepared by adding polyurethane and Zonyl FSN fluorosurfactant to tetrahydrofuran. The polyurethane was added in an amount to make a 1% by weight solution and the Zonyl FSN fluorosurfactant was added in an amount to make a 0.5% by weight solution.

A microporous, hydrophobic expanded polytetrafluoroethylene membrane of an average bubble point of 0.83 laminated to a polypropylene backing was immersed in the solution. Three different samples of the same membrane were used. One was immersed for 5 minutes, one for 15 minutes and one for 30 minutes at ambient conditions. After removal from the solution, the samples were dried by affixing them on hoops and placing the hoops in a vacuum oven at 60° C. and 30 inches (76 cm) mercury for 15 minutes.

By the same procedure, Zonyl FSA fluorosurfactant and Fluorad FC-171 fluorosurfactant were each used in place of the zonyl FSN fluorosurfactant.

Weight add-on of solids is shown in Table 2 below. The table also shows water wettability of the treated samples.

TABLE 2

| Sample | Immersion Time (min) | Pre-Treatment Weight (g) | Post-Treatment Weight (g) | % Add-On | Water Wetta-bility* |
|---|---|---|---|---|---|
| Zonyl FSN | 5 | 0.60 | 0.69 | 15.00 | yes |
| Zonyl FSN | 15 | 0.54 | 0.64 | 18.52 | " |
| Zonyl FSN | 30 | 0.48 | 0.57 | 18.75 | " |
| Zonyl FSA | 5 | 0.55 | 0.63 | 14.55 | " |
| Zonyl FSA | 15 | 0.50 | 0.58 | 16.00 | " |
| Zonyl FSA | 30 | 0.51 | 0.61 | 19.61 | " |
| Fluorad FC-171 | 5 | 0.52 | 0.57 | 9.62 | " |
| Fluorad FC-171 | 15 | 0.51 | 0.56 | 9.80 | " |
| Fluorad FC-171 | 30 | 0.54 | 0.59 | 9.26 | " |

*Sample became transparent upon contact with water.

EXAMPLE 3

Using the Fluorad FC-430 fluorosurfactant and polyurethan, a solution in tetrahydrofuran was prepared, and an average bubble point of 0.83 expanded porous polytetrafluoroethylene membrane laminated to a nonwoven polypropylene was immersed in the solution for 24 hours. After air drying at room temperature overnight, the samples were tested for durability.

Durability results are shown in Table III. Samples were tested as dried, after being boiled in water for 1 hour, after being heated in 1N HCl at 80° C. for 1 hour and after being immersed in 1N NaOH (filtration) and 5N NaOH for 1 hour.

Results for samples immersed in various tetrahydrofuran compositions are as follows: (in the table, N.F. means No Flow, and of the two numbers, e.g. "9.62", the first number means the number of seconds it took for the first drop of water to go through the sample in the VFT test; and the second number is the number of seconds it took for 50 ml of water to flow through the sample.)

| | As Dried Durability | Durability After 1 Hour in Boiling Water | Durability After 1 Hour in 1N HCl at 80° | Durability After NaOH |
|---|---|---|---|---|
| 6 Hour Treatment of Sample in Various Compositions with Tetrahydrofuran (THF) Solvent | | | | |
| In THF alone | NF | NF | NF | NF |
| In THF and FC-430 | 9/62 | NF | 35/211 | 8/336 |
| In THF and polyurethane | 6/289 | 166/589 | 35/420 | 131/3120 |
| In THF and FC-430 and polyurethane | 5/189 | 55/270 | 3/38 | 19/635 |
| 24 Hour Treatment | | | | |
| In THF alone | NF | NF | NF | NF |
| In THF and FC 430 | 4/59 | NF | 5/59 | 7/210 |
| In THF and polyurethane | NF | 25/286 | 60/2854 | 54/2403 |
| In THF and FC 430 and polyurethane | 6/172 | 14/96 | 5/78 | 7.2/225 |

The THF alone, it is seen the THF has no effect on the membrane regarding water flow through. With FC-430 or polyurethane alone in THF, it is seen that the samples are less durable after treatment in boiling water, HCl and NaOH. It is also seen that durability is generally improved over any of the samples where both FC-430 and polyurethane are present. It is also seen that after acid treatment water flow through is improved.

I claim:
1. A water-permeable hydrophilic membrane comprising a porous fluoropolymeric membrane having continuous pores from one side to the other, in which the membrane interior is coated with a mixture of a fluoroaliphatic surfactant and a hydrophilic, substantially water insoluble polyurethane.
2. The hydrophilic membrane of claim 1 wherein the membrane is liquid water-resistant but water vapor-permeable.
3. The hydrophilic membrane of claim 2 wherein the membrane is expanded porous polytetrafluoroethylene.
4. The hydrophilic membrane of claim 1, 2 or 3 wherein the fluoroaliphalic surfactant has an end group of the formula $H_3C(CF_2)_m$ wherein m is an integer of 3 through 8, imparts a surface tension to water of less than 30 dynes per cm, and is an alcohol, an ester, an organic acid or an organic salt.
5. The hydrophilic membrane of claim 1, 2 or 3 wherein the hydrophilic polyurethane is the reaction product of a diisocyanate, a poly(oxyalkylene) glycol having predominately oxyethylene groups, and optionally a chain extender.

6. The hydrophilic membrane of claim 4 wherein the hydrophilic polyurethane is the reaction product of a diisocyanate, a poly(oxyalkylene) glycol having predominately oxyethylene groups, and optionally a chain extender.

7. Process for preparing a hydrophilic membrane which comprises subjecting a hydrophilic fluoropolymeric membrane having continuous pores from one side to the other to a solution of a fluoroaliphatic surfactant and a hydrophilic, substantially waterinsoluble polyurethane in an organic solvent and then drying the resulting membrane to remove solvent.

* * * * *